(12) United States Patent
Inoue et al.

(10) Patent No.: US 8,932,710 B2
(45) Date of Patent: Jan. 13, 2015

(54) ADHESIVE OPTICAL FILM, MULTILAYER OPTICAL FILM AND IMAGE DISPLAY

(75) Inventors: Shinichi Inoue, Ibaraki (JP); Kohei Yano, Ibaraki (JP); Masayuki Satake, Ibaraki (JP); Yutaka Moroishi, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 978 days.

(21) Appl. No.: 12/282,757

(22) PCT Filed: Mar. 13, 2007

(86) PCT No.: PCT/JP2007/054928
§ 371 (c)(1),
(2), (4) Date: Sep. 12, 2008

(87) PCT Pub. No.: WO2007/108363
PCT Pub. Date: Sep. 27, 2007

(65) Prior Publication Data
US 2009/0087650 A1 Apr. 2, 2009

(30) Foreign Application Priority Data

Mar. 15, 2006 (JP) ................................. 2006-071367
Aug. 9, 2006 (JP) ................................. 2006-217151

(51) Int. Cl.
*B32B 27/36* (2006.01)
*C08F 120/18* (2006.01)
(Continued)

(52) U.S. Cl.
CPC ........... *C09J 7/0217* (2013.01); *C08G 18/6254* (2013.01); *C08G 18/6283* (2013.01);
(Continued)

(58) Field of Classification Search
USPC .................................................. 524/556, 560
See application file for complete search history.

(56) References Cited

U.S. PATENT DOCUMENTS 4,185,051 A * 1/1980 McKenna et al. ............. 525/370
6,086,994 A * 7/2000 Oura et al. .................... 428/345
(Continued)

FOREIGN PATENT DOCUMENTS

CN 1490372 A 4/2004
JP 6-108025 A 4/1994
(Continued)

OTHER PUBLICATIONS

International Search Report of PCT/JP2007/054928, date of mailing Jun. 26, 2007.
(Continued)

*Primary Examiner* — Callie Shosho
*Assistant Examiner* — Cheng Huang
(74) *Attorney, Agent, or Firm* — Westerman, Hattori, Daniels & Adrian, LLP

(57) ABSTRACT

To provide a pressure-sensitive adhesive optical film that can satisfy durability even when a thin pressure-sensitive adhesive layer is formed. A pressure-sensitive adhesive optical film comprising an optical film and a pressure-sensitive adhesive layer on at least one side of the optical film, wherein the pressure-sensitive adhesive layer is formed by a pressure-sensitive adhesive, comprising: a (meth)acrylic polymer having a weight average molecular weight of 1,500,000 to 2,800,000; containing, as a monomer component, 3 to 10% by weight of a heterocyclic ring-containing acrylic monomer; 0.5 to 5% by weight of a carboxyl group-containing monomer; 0.05 to 2% by weight of a hydroxyl group-containing monomer; and 83 to 96.45% by weight of an alkyl(meth) acrylate monomer, and a crosslinking agent.

12 Claims, 1 Drawing Sheet

(51) Int. Cl.

| | |
|---|---|
| *C08F 26/06* | (2006.01) |
| *C09J 7/02* | (2006.01) |
| *C08G 18/62* | (2006.01) |
| *C08G 18/80* | (2006.01) |
| *C09J 133/06* | (2006.01) |
| *C09J 133/14* | (2006.01) |
| *C09J 175/04* | (2006.01) |
| *G02B 5/30* | (2006.01) |

(52) U.S. Cl.
CPC ........... *C08G18/8029* (2013.01); *C09J 7/0246* (2013.01); *C09J 133/066* (2013.01); *C09J 133/14* (2013.01); *C09J 175/04* (2013.01); *C08G 2170/40* (2013.01); *C09J 2433/00* (2013.01); *G02B 5/3083* (2013.01)
USPC ........... 428/343; 428/335; 428/336; 524/556; 524/560; 526/260; 526/258; 526/265; 526/329.7

(56) References Cited

U.S. PATENT DOCUMENTS

| | | | |
|---|---|---|---|
| 2002/0025441 A1* | 2/2002 | Hieda et al. .................... 428/440 |
| 2005/0266239 A1* | 12/2005 | Satake et al. .................. 428/354 |
| 2006/0062938 A1* | 3/2006 | Takeko et al. ................ 428/1.55 |
| 2006/0108050 A1* | 5/2006 | Satake et al. .................. 156/101 |
| 2006/0121273 A1 | 6/2006 | Toyama et al. | |
| 2007/0196646 A1* | 8/2007 | Matano et al. .......... 428/355 AC |
| 2009/0022988 A1 | 1/2009 | Toyama et al. | |

FOREIGN PATENT DOCUMENTS

| | | |
|---|---|---|
| JP | 9-59580 A | 3/1997 |
| JP | 9-310050 A | 12/1997 |
| JP | 2000-63458 A | 2/2000 |
| JP | 2001-323235 A | 11/2001 |
| JP | 2005-126699 A | 5/2005 |
| TW | 200621925 B | 4/2007 |

OTHER PUBLICATIONS

Notification of Transmittal of Translation of the International Preliminary Report on Patentability (Form PCT/IB/326 and PCT/IB/338) of International Application No. PCT/JP2007/054928 mailed Sep. 25, 2008 with Forms PCT/IB/373 and PCT/ISA/237.
Chinese Office Action dated Sep. 11, 2009, issued in corresponding Chinese Patent Application No. 200780007984.4.
Taiwanese Office Action dated Oct. 1, 2010, issued in corresponding Taiwanesse Patent Application No. 096108904.
Extended European Search Report dated Mar. 19, 2013, issued in corresponding European Patent Application No. 07738400.6.

* cited by examiner

ADHESIVE OPTICAL FILM, MULTILAYER OPTICAL FILM AND IMAGE DISPLAY

TECHNICAL FIELD

The invention relates to a pressure-sensitive adhesive optical film including a pressure-sensitive adhesive layer placed on at least one side of an optical film. The invention also relates to a laminated optical film laminating the pressure-sensitive adhesive optical film and another optical film. The invention further relates to an image display, such as a liquid crystal display, using the pressure-sensitive adhesive optical film or the laminated optical film and an organic EL display. Examples of the optical film include a polarizing plate, a retardation plate, an optical compensation film, and a brightness enhancement film. These optical films may be used to form the laminate, as described above.

BACKGROUND ART

A liquid crystal display indispensably requires polarizing elements disposed on both sides of a liquid crystal cell because of an image forming method adopted therein and generally polarizing plates are adhered. Besides, on a liquid crystal panel, various kinds of optical elements have been used in addition to a polarizing plate in order to improve a display quality of a display. For example, there have been used a retardation plate for coloration prevention, a viewing angle increasing film for improving a viewing angle of a liquid crystal display and a brightness enhancement film for raising a contrast of a display. The films each are collectively referred to an optical film.

A pressure-sensitive adhesive is usually employed in adhering an optical film described above to a liquid crystal cell. An optical film and a liquid crystal cell or optical films are usually adhered to each other using a pressure-sensitive adhesive therebetween in order to reduce a light loss. In such cases, a pressure-sensitive adhesive optical film in which a pressure-sensitive adhesive is provided in advance on one surface of an optical film as a pressure-sensitive adhesive layer is generally used because of a merit such as that no necessity arises for a drying step of fix the optical film.

The image display such as a liquid crystal display in which the pressure-sensitive adhesive optical film is applied is used in various environments. Therefore, the pressure-sensitive adhesive optical film is required to have durability such as heat resistance in a high temperature environment and humidity resistance in a high humidity environment. As a pressure-sensitive adhesive for a polarizing film and a glass substrate of a liquid crystal cell in which such durability is improved, it is proposed to use a pressure-sensitive adhesive including a (meth)acrylic resin in which 0.3 to 10% by weight of an amino group and/or amide group-containing (meth)acrylic monomer component is copolymerized (see Patent Literature 1 listed below).

On the other hand, in recent years, a thin-model image display has been desired, and, therefore, a thin-model pressure-sensitive adhesive optical film also has been desired. With such a thin-model product has been demanded, a thin-model pressure-sensitive adhesive layer of the pressure-sensitive adhesive optical film also has been demanded. However, as the pressure-sensitive adhesive layer is formed thin, it becomes difficult to satisfy durability. Even when the pressure-sensitive adhesive disclosed in Patent Literature 1 is used, it becomes impossible to satisfy durability, as the pressure-sensitive adhesive layer is formed thin.

Patent Literature 1: JP-A No. 06-108025

DISCLOSURE OF THE INVENTION

Problems to be Solved by the Invention

The invention has been made in view of the above circumstances, and an object of the invention is to provide a pressure-sensitive adhesive optical film that can satisfy durability even when a thin pressure-sensitive adhesive layer is formed.

Another object of the invention is to provide a laminated optical film using the pressure-sensitive adhesive optical film and to provide an image display using the pressure-sensitive adhesive optical film or the laminated optical film.

Means for Solving the Problems

As a result of intensive investigations for solving the above problems, the inventors have found that the objects can be achieved with the pressure-sensitive adhesive optical film described below and thus have completed the present invention.

The present invention relates to a pressure-sensitive adhesive optical film comprising an optical film and a pressure-sensitive adhesive layer on at least one side of the optical film, wherein the pressure-sensitive adhesive layer is formed by a pressure-sensitive adhesive, comprising:

a (meth)acrylic polymer having a weight average molecular weight of 1,500,000 to 2,800,000; containing, as a monomer component, 3 to 10% by weight of a heterocyclic ring-containing acrylic monomer;

0.5 to 5% by weight of a carboxyl group-containing monomer;

0.05 to 2% by weight of a hydroxyl group-containing monomer; and 83 to 96.45% by weight of an alkyl(meth)acrylate monomer, and a crosslinking agent.

In the pressure-sensitive adhesive optical film, the heterocyclic ring-containing acrylic monomer having a morpholine ring, a piperidine ring or a pyrrolidine ring as a heterocyclic ring is preferably used.

In the pressure-sensitive adhesive optical film, as the carboxyl group-containing monomer, an acrylic acid is preferably used.

In the pressure-sensitive adhesive optical film, as the hydroxyl group-containing monomer, a hydroxyalkyl(meth)acrylate is preferably used.

In the pressure-sensitive adhesive optical film, as the crosslinking agent, an isocyanate crosslinking agent is preferably used.

In the pressure-sensitive adhesive optical film, an amount of the crosslinking agent is preferably from 0.02 to 2 parts by weight, based on 100 parts by weight of the (meth)acrylic polymer.

The pressure-sensitive adhesive optical film is suitable even in which the pressure-sensitive adhesive layer has a thin thickness of 1 to 15 μm.

In the pressure-sensitive adhesive optical film, various kinds of the optical film may be of used. However, a pressure-sensitive adhesive-type polarizing plate used a polarizing plate as an optical film or a pressure-sensitive adhesive-type retardation plate used a retardation plate as an optical film may be preferred.

The invention is also related to a laminated optical film in which the pressure-sensitive adhesive optical film is laminated on another optical film with the pressure-sensitive adhesive layer interposed therebetween. The pressure-sensitive adhesive layer of the pressure-sensitive adhesive optical film of the invention is preferable for using in lamination of an optical film and an optical film. Particularly when the pressure-sensitive adhesive layer is made thin, it is preferable.

In the laminated optical film, it is preferable in the case where the pressure-sensitive adhesive optical film is a pressure-sensitive adhesive-type polarizing plate, on which a retardation plate may be placed as another optical film.

The invention is also related to an image display including at least one sheet of the pressure-sensitive adhesive optical film or the laminated optical film. One or more sheets of the pressure-sensitive adhesive optical film and/or the laminated optical film of the invention may be used alone or in combination depending on various operational mode of the image display such as a liquid crystal display.

Effects of the Invention

In the pressure-sensitive adhesive optical film of the invention, the pressure-sensitive adhesive includes, as a base polymer, a (meth)acrylic polymer including the specific amount of a heterocyclic ring-containing acrylic monomer, a carboxyl group-containing monomer, a hydroxyl group-containing monomer, and an alkyl(meth)acrylate. The weight average molecular weight of the (meth)acrylic polymer is controlled to be large molecular weight of 1,500,000 to 2,800,000. As described above, since the (meth)acrylic polymer used as a base polymer in the pressure-sensitive adhesive according to the invention includes the specific amount of the specific monomer and has the controlled high molecular weight, the pressure-sensitive adhesive layer can satisfy durability such as heat resistance and humidity resistance, even when the layer is made thin. For example, when a retardation plate is used as the optical film in the pressure-sensitive adhesive optical film or the laminated optical film of the invention, high durability can be achieved so that a change in retardation can be kept small even in an environment where the retardation plate is heated or humidified. If the monomer species is not used for the (meth)acrylic polymer, if the content of the monomer is outside the used range, or if the weight average molecular weight of the (meth)acrylic polymer is outside the range, durability cannot be satisfied, when the pressure-sensitive adhesive layer is made thin.

As described above, since the pressure-sensitive adhesive optical film of the invention can satisfy durability even when the pressure-sensitive adhesive layer is made thin, it can contribute to make an image display such as a liquid crystal display thin. In particular, the pressure-sensitive adhesive optical film is preferably suitable for using in lamination of an optical film and an optical film. That is, in the pressure-sensitive adhesive optical film of the invention, even when the pressure-sensitive adhesive layer is used for a lamination, the total thickness of the laminated optical film can be kept small, because the pressure-sensitive adhesive layer is made thin. Therefore, the laminated optical film may be used in a wide range of applications, and a plurality of kinds of optical films may be used, or various optical films may be used in combination.

When a thin-model pressure-sensitive adhesive layer is used as the pressure-sensitive adhesive optical film of the invention, the level of adhesive displacement at the edge of the pressure-sensitive adhesive optical film can be controlled to be low. When the thin-model pressure-sensitive adhesive layer is formed, the pressure-sensitive adhesive can be coated at low concentration so that the appearance of the pressure-sensitive adhesive layer and hence the appearance of the pressure-sensitive adhesive optical film can be improved. In addition, the area of application of the adhesive can be reduced so that generation of an adhesive lacking portion can be prevented. Further, in the process of stamping the pressure-sensitive adhesive optical film, the pressure-sensitive adhesive layer is also less likely to protrude. Therefore, protrusion and sticking of the pressure-sensitive adhesive is less likely to occur at the cut section, and generation of an adhesive lacking portion associated with protrusion and sticking of the pressure-sensitive adhesive is also less likely to occur.

DESCRIPTION OF REFERENCE SYMBOLS

A: pressure-sensitive adhesive optical film
1: optical film
11: polarizing plate
12 and 13: retardation plate
2(21, 22, and 23): pressure-sensitive adhesive layer
G: glass substrate

BEST MODE FOR CARRYING OUT THE INVENTION

Figure 1:
FIG. 1 is a diagram showing an example of the pressure-sensitive adhesive optical film of the invention.

The pressure-sensitive adhesive optical film of the invention is described herein below with reference to the drawings. Referring to FIG. 1, for example, in the pressure-sensitive adhesive optical film A, a pressure-sensitive adhesive layer 2 is laminated on one side of an optical film 1.

Figure 2:
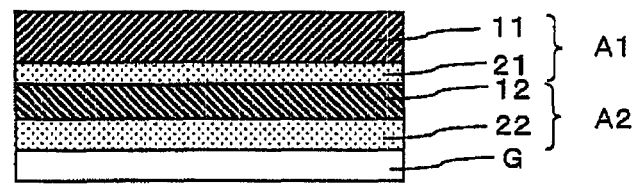
FIG. 2 is a diagram showing an example of the laminated pressure-sensitive adhesive optical film of the invention.
Figure 3:
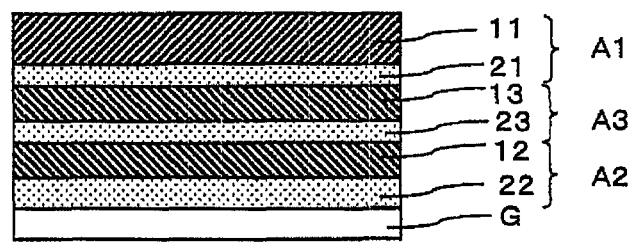
FIG. 3 is a diagram showing an example of the laminated pressure-sensitive adhesive optical film.

FIG. 2 shows a lamination of a pressure-sensitive adhesive optical film A1 and a pressure-sensitive adhesive optical film A2. The pressure-sensitive adhesive optical film A1 includes a polarizing plate 11 as an optical film and a pressure-sensitive adhesive layer 21 is laminated thereon. The pressure-sensitive adhesive optical film A2 includes a retardation plate 12 as an optical film and a pressure-sensitive adhesive layer 22 is laminated thereon. In FIG. 3, the pressure-sensitive adhesive optical film A1, a pressure-sensitive adhesive optical film A3 and the pressure-sensitive adhesive optical film A2 are laminated in this order. The pressure-sensitive adhesive optical film A3 includes a retardation plate 13 as an optical film and a pressure-sensitive adhesive layer 23 is laminated thereon. In FIGS. 2 and 3, the pressure-sensitive adhesive layer 22 is adhered to a glass substrate G, which is used as a liquid crystal cell substrate or the like.

In the laminated optical film of the invention, a pressure-sensitive adhesive optical film may be laminated on an optical film. Therefore, the laminated optical film of the invention includes the case where a pressure-sensitive adhesive optical film and a pressure-sensitive adhesive-type optical are laminated. In the invention, the type of the pressure-sensitive adhesive optical film to be laminated or the number of the lamination is not limited to that shown in FIG. 2 or 3. In the laminated optical film of the invention, at least one sheet of the pressure-sensitive adhesive optical film of the invention may be used. The pressure-sensitive adhesive optical film to which the pressure-sensitive adhesive optical film of the invention may be adhered is not particularly limited, and it is preferable that pluralities of the pressure-sensitive adhesive optical films of the invention are used from the viewpoint of making thin.

The pressure-sensitive adhesive optical film of the invention may be used for any of the pressure-sensitive adhesive optical films A1, A2 and A3. In particular, the pressure-sensitive adhesive optical film of the invention is suitable for using in lamination of an optical film and an optical film. In FIG. 2 or 3, the pressure-sensitive adhesive optical film of the invention is preferably used for the pressure-sensitive adhesive optical film A1 or A3.

In the pressure-sensitive adhesive optical film of the invention, the pressure-sensitive adhesive used to form the pressure-sensitive adhesive layer includes, as a base polymer, a (meth)acrylic polymer including 3 to 10% by weight of a heterocyclic ring-containing acrylic monomer, 0.5 to 5% by weight of a carboxyl group-containing monomer, 0.05 to 2% by weight of a hydroxyl group-containing monomer, and 83 to 96.45% by weight of an alkyl(meth)acrylate monomer.

Any type of heterocyclic ring-containing acrylic monomer having a polymerizable functional group and a heterocyclic ring may be used. The polymerizable functional group may be a (meth)acryloyl group, a vinyl ether group, or the like. Among them, a (meth)acryloyl group is preferred. Examples of the heterocyclic ring include a morpholine ring, a piperidine ring, a pyrrolidine ring, and a piperazine ring. Examples of the heterocyclic ring-containing acrylic monomer include N-acryloylmorpholine, N-acryloylpiperidine, N-methacryloylpiperidine, and N-acryloylpyrrolidine. Among them, N-acryloylmorpholine is preferred. The heterocyclic ring-containing acrylic monomer can improve any durability of heat resistance and humidity resistance, when the pressure-sensitive adhesive layer is made thin. If the monomer containing an amino group, an alicyclic group or the like is used in place of the heterocyclic ring-containing acrylic monomer, durability of heat resistance and humidity resistance would not be achieved.

The heterocyclic ring-containing acrylic monomer is also preferred in that it can improve the adhesive strength of the pressure-sensitive adhesive layer to the optical film. In particular, it is preferable in that it can improve the adhesive strength of a norbornene resin to a cyclic polyolefin, and it is preferred, when a cyclic polyolefin is used for the optical film.

The heterocyclic ring-containing acrylic monomer is used in an amount of 3 to 10% by weight, based on the total amount of the monomer components for forming the (meth)acrylic polymer. The content of the heterocyclic ring-containing acrylic monomer is preferably from 4 to 9.5% by weight, more preferably from 6 to 9% by weight. If the content of the heterocyclic ring-containing acrylic monomer is below the range, durability of heat resistance and humidity resistance would not be achieved, when the pressure-sensitive adhesive layer is made thin. If the content of the heterocyclic ring-containing acrylic monomer is above the range, humidity resistance would not be achieved, when the layer is made thin. The heterocyclic ring-containing acrylic monomer can improve the adhering properties of the pressure-sensitive adhesive layer, but if the content of the heterocyclic ring-containing acrylic monomer is above the range, the improvement effect of the adhering properties can be lowered. In addition, if the content of the heterocyclic ring-containing acrylic monomer is above the range, it is not preferable in that the adhesive strength is lowered.

Any type of carboxyl group-containing monomer having a polymerizable functional group and a carboxyl group may be used. Examples of the carboxyl group-containing monomer include such as (meth)acrylic acid, carboxyethyl (meth)acrylate, carboxypentyl(meth)acrylate, itaconic acid, maleic acid, fumaric acid, and crotonic acid. Among them, (meth)acrylic acid, in particular, acrylic acid is preferred.

The carboxyl group-containing monomer is used in an amount of 0.5 to 5% by weight, based on the total amount of the monomer components used for forming the (meth)acrylic polymer. The content of the carboxyl group-containing monomer is preferably from 1 to 4.5% by weight, more preferably from 1.5 to 4% by weight. If the content of the carboxyl group-containing monomer is below the range, heat resistance would not be achieved, when the pressure-sensitive adhesive layer is made thin. If the content of the carboxyl group-containing monomer is above the range, durability of heat resistance and humidity resistance would not be achieved, when the layer is made thin. In addition, if the content of the carboxyl group-containing monomer is above the range, it is not preferable in that the adhesive strength is lowered.

Any type of hydroxyl group-containing monomer having a polymerizable functional group and a hydroxyl group may be used. Examples of the hydroxyl group-containing monomer include hydroxyalkyl(meth)acrylates such as 2-hydroxyethyl (meth)acrylate, 2-hydroxybutyl(meth)acrylate, 3-hydroxypropyl(meth)acrylate, 4-hydroxybutyl(meth)acrylate, 6-hydroxyhexyl(meth)acrylate, 8-hydroxyoctyl(meth)acrylate, 10-hydroxydecyl(meth)acrylate, and 12-hydroxylauryl (meth)acrylate; and other hydroxyl group-containing compounds such as (4-hydroxymethylcyclohexyl)methyl acrylate, N-methylol(meth)acrylamide, N-hydroxy(meth)acrylamide, allyl alcohol, 2-hydroxyethyl vinyl ether, 4-hydroxybutyl vinyl ether, and diethylene glycol monovinyl ether. Among them, hydroxyalkyl(meth)acrylates are preferred.

The hydroxyl group-containing monomer is used in an amount of 0.05 to 2% by weight, based on the total amount of the monomer components for forming the (meth)acrylic polymer. The content of the hydroxyl group-containing monomer is preferably from 0.075 to 1.5% by weight, more preferably from 0.1 to 1% by weight. If the content of the hydroxyl group-containing monomer is below the range, heat resistance would not be achieved, when the pressure-sensitive adhesive layer is made thin. If the content of the hydroxyl group-containing monomer is above the range, durability of heat resistance and humidity resistance would not be achieved, when the layer is made thin. In addition, if the content of the hydroxyl group-containing monomer is above the range, it is not preferable in that the adhering properties and the adhesive strength are lowered.

The average number of carbon atoms in the alkyl group of the alkyl(meth)acrylate may be from about 1 to 12. Here, (meth)acrylate refers to acrylate and/or methacrylate, and "meth" has the same meaning with respect to the invention. Specific examples of the alkyl(meth)acrylate include such as methyl(meth)acrylate, ethyl(meth)acrylate, n-butyl(meth)acrylate, 2-ethylhexyl(meth)acrylate, isooctyl(meth)acrylate, isononyl(meth)acrylate, and lauryl(meth)acrylate, and they may be used alone or in combination. Among them, it is preferable that the number of carbon atom in the alkyl group of the alkyl (meth)acrylate is 1 to 9.

The alkyl(meth)acrylate is used in an amount of 83 to 96.45% by weight, based on the total amount of the monomer components for forming the (meth)acrylic polymer. The alkyl (meth)acrylate is generally the residue part other than the heterocyclic ring-containing acrylic monomer, the carboxyl group-containing monomer and the hydroxyl group-containing monomer.

As a monomer component for forming the (meth)acrylic polymer, any monomer other than the above may be used in an amount of 10% by weight or less of the total amount of the monomer, in a range that the object of the invention is not deteriorated.

Examples of such an optional monomer include acid anhydride group-containing monomers such as maleic anhydride and itaconic anhydride; caprolactone adducts of acrylic acid; sulfonic acid group-containing monomers such as styrenesulfonic acid, allylsulfonic acid, 2-(meth)acrylamido-2-methylpropanesulfonic acid, (meth)acrylamidopropanesulfonic acid, and sulfopropyl(meth)acrylate, and (meth)acryloyloxynaphthalenesulfonic acid; phosphate group-containing monomers such as 2-hydroxyethylacryloyl phosphate; and nitrogen-containing vinyl monomers such as maleimide, N-cyclohexylmaleimide, N-phenylmaleimide; (N-substituted) amide monomers such as (meth)acrylamide, N,N-dimethyl(meth)acrylamide, N,N-diethyl(meth)acrylamide, N-hexyl(meth)acrylamide, N-methyl(meth)acrylamide, N-butyl(meth)acrylamide, N-butyl(meth)acrylamide, N-methylol(meth)acrylamide, and N-methylolpropane(meth)acrylamide; alkylaminoalkyl(meth)acrylate monomers such as aminoethyl(meth)acrylate, aminopropyl(meth)acrylate, N,N-dimethylaminoethyl (meth)acrylate, tert-butylaminoethyl(meth)acrylate, and 3-(3-pyridinyl)propyl(meth)acrylate; alkoxyalkyl(meth)acrylate monomers such as methoxyethyl (meth)acrylate and ethoxyethyl(meth)acrylate; and succinimide monomers such as N-(meth)acryloyloxymethylenesuccinimide, N-(meth)acryloyl-6-oxyhexamethylenesuccinimide, and N-(meth)acryloyl-8-oxyoctamethylenesuccinimide.

It is also possible to use vinyl monomers such as vinyl acetate, vinyl propionate, N-vinylpyrrolidone, methylvinylpyrrolidone, vinylpyridine, vinylpiperidone, vinylpyrimidine, vinylpiperazine, vinylpyrazine, vinylpyrrole, vinylimidazole, vinyloxazole, vinylmorpholine, N-vinylcarboxylic acid amides, styrene, α-methylstyrene, and N-vinylcaprolactam; cyanoacrylate monomers such as acrylonitrile and methacrylonitrile; epoxy group-containing acrylic monomers such as glycidyl(meth)acrylate; glycol acrylate monomers such as polyethylene glycol (meth)acrylate, polypropylene glycol (meth)acrylate, methoxyethylene glycol (meth)acrylate, and methoxypolypropylene glycol (meth)acrylate; and acrylate ester monomers such as tetrahydrofurfuryl (meth) acrylate, fluoro(meth)acrylate, silicone (meth)acrylate, and 2-methoxyethyl acrylate.

Copolymerizable monomers other than the above include silicon atom-containing silane monomers. Examples of silane monomers include 3-acryloxypropyltriethoxysilane, vinyltrimethoxysilane, vinyltriethoxysilane, 4-vinylbutyltrimethoxysilane, 4-vinylbutyltriethoxysilane, 8-vinyloctyltrimethoxysilane, 8-vinyloctyltriethoxysilane, 10-methacryloyloxydecyltrimethoxysilane, 10-acryloyloxydecyltrimethoxysilane, 10-methacryloyloxydecyltriethoxysilane, and 10-acryloyloxydecyltriethoxysilane.

The (meth)acrylic polymer of the invention has a weight average molecular weight of 1,500,000 to 2,800,000, preferably of 1,700,000 to 2,700,000, more preferably of 2,000,000 to 2,500,000. If the weight average molecular weight is below the range, durability of heat resistance and humidity resistance would not be achieved, when the pressure-sensitive adhesive layer is made thin. If the weight average molecular weight is above the range, the durability would not be achieved, when the layer is made thin. In addition, it is not preferable in that the adhering properties and the adhesive strength are lowered. The weight average molecular weight refers to a value measured by gel permeation chromatography (GPC) and calculated by polystyrene conversion.

Such (meth)acrylic polymer may be produced by any appropriately selected known method such as solution polymerization, bulk polymerization, emulsion polymerization, or various types of radical polymerization. The resulting (meth)acrylic polymer may be any of a random copolymer, a block copolymer and a graft copolymer.

In solution polymerization, for example, ethyl acetate, toluene or the like is used as a polymerization solvent. Specific example of solution polymerization includes performing the reaction under a stream of inert gas such as nitrogen in the presence of a polymerization initiator typically under the reaction condition of a temperature of about 50 to about 70° C. and a time period of about 5 to about 30 hours.

A polymerization initiator, a chain transfer agent, an emulsifying agent, or the like for radical polymerization are not particularly limited, and may be used by appropriate selection. The weight average molecular weight of the (meth) acrylic polymer may be controlled by the amount of the polymerization initiator or the chain transfer agent or by the reaction condition. The amount may be adjusted as appropriate depending on the type of these materials.

Examples of the polymerization initiator include, but are not limited to, azo initiators such as 2,2'-azobisisobutylonitrile, 2,2'-azobis(2-amidinopropane)dihydrochloride, 2,2'-azobis[2-(5-methyl-2-imidazoline-2-yl)propane]dihydrochloride, 2,2'-azobis(2-methylpropionamidine)disulfate, 2,2'-azobis(N,N'-dimethyleneisobutylamidine), and 2,2'-azobis[N-(2-carboxyethyl)-2-methylpropionamidine]hydrate (VA-057, manufactured by Wako Pure Chemical Industries, Ltd.); persulfates such as potassium persulfate and ammonium persulfate; peroxide initiators such as di(2-ethylhexyl)peroxydicarbonate, di(4-tert-butylcyclohexyl)peroxydicarbonate, di-sec-butylperoxydicarbonate, tert-butylperoxyneodecanoate, tert-hexylperoxypivalate, tert-butylperoxypivalate, dilauroyl peroxide, di-n-octanoyl peroxide, 1,1,3,3-tetramethylbutylperoxy-2-ethyl hexanoate, di(4-methylbenzoyl) peroxide, dibenzoyl peroxide, tert-butylperoxyisobutylate, 1,1-di(tert-hexylperoxy)cyclohexane, tert-butylhydroperoxide, and hydrogen peroxide; and redox system initiators of a combination of a peroxide and a reducing agent, such as a combination of a persulfate and sodium hydrogen sulfite and a combination of a peroxide and sodium ascorbate.

One of the above polymerization initiators may be used alone, or two or more thereof may be used in a mixture. The total content of the polymerization initiator is preferably from about 0.005 to 1 part by weight, more preferably from about 0.02 to 0.5 parts by weight, based on 100 parts by weight of the monomer.

For example, when the (meth)acrylic polymer with a weight average molecular weight of the above range is produced using 2,2'-azobisisobutyronitrile as a polymerization initiator, the amount of the polymerization initiator is preferably from about 0.06 to 0.2 part by weight, more preferably from about 0.08 to 0.175 part by weight, based on 100 parts by weight of the total amount of the monomer components.

Examples of the chain transfer agent include lauryl mercaptan, glycidyl mercaptan, mercaptoacetic acid, 2-mercaptoethanol, thioglycolic acid, 2-ethylhexyl thioglycolate, and 2,3-dimercapto-1-propanol. The chain transfer agents may be used alone, or two or more thereof may be used in a mixture. The total content of the chain transfer agent is 0.01 parts by weight or less, based on 100 parts by weight of the monomer.

Examples of the emulsifier used in emulsion polymerization include anionic emulsifiers such as sodium lauryl sulfate, ammonium lauryl sulfate, sodium dodecylbenzenesulfonate, ammonium polyoxyethylene alkyl ether sulfate, and sodium polyoxyethylene alkyl phenyl ether sulfate; and nonionic emulsifiers such as polyoxyethylene alkyl ether, polyoxyethylene alkyl phenyl ether, polyoxyethylene fatty acid ester, and polyoxyethylene-polyoxypropylene block polymers. These emulsifiers may be used alone, or two or more thereof may be used in combination.

The emulsifier may be a reactive emulsifier. Examples of such an emulsifier having an introduced radical-polymerizable functional group such as a propenyl group and an allyl ether group include Aqualon HS-10, HS-20, KH-10, BC-05, BC-10, and BC-20 (each manufactured by Dai-ichi Kogyo Seiyaku Co., Ltd.) and Adekaria Soap SE10N (manufactured by Asahi Denka Kogyo K.K.). The reactive emulsifier is preferred, because after polymerization, it can be incorporated into a polymer chain to improve water resistance. Based on 100 parts by weight of the monomer, the emulsifier is preferably used in an amount of 0.3 to 5 parts by weight, more preferably of 0.5 to 1 parts by weight, in view of polymerization stability or mechanical stability.

The pressure-sensitive adhesive is preferable a pressure-sensitive adhesive composition comprising a crosslinking agent. Examples of the crosslinking agent that may be blended into the pressure-sensitive adhesive include organic crosslinking agents and multifunctional metal chelates. Examples of organic crosslinking agents include epoxy crosslinking agents, isocyanate crosslinking agents, imine crosslinking agents, oxazoline crosslinking agents, melamine crosslinking agents, and aziridine crosslinking agents. The organic crosslinking agent is preferably an isocyanate crosslinking agent. The multifunctional metal chelate may comprise a multivalent metal and an organic compound that are covalently or coordinately bonded to one another. Examples of the multivalent metal atom include Al, Cr, Zr, Co, Cu, Fe, Ni, V, Zn, In, Ca, Mg, Mn, Y, Ce, Sr, Ba, Mo, La, Sn, and Ti. The organic compound has a covalent or coordinate bond-forming atom such as an oxygen atom. Examples of the organic compound include alkyl esters, alcohol compounds, carboxylic acid compounds, ether compounds, and ketone compounds.

Examples of the isocyanate crosslinking agent include aromatic isocyanates such as tolylene diisocyanate and xylene diisocyanate, alicyclic isocyanates such as isophorone diisocyanate, and aliphatic isocyanates such as hexamethylene diisocyanate.

More specifically, lower aliphatic polyisocyanates such as butylene diisocyanate and hexamethylene diisocyanate; alicyclic isocyanates such as cyclopentylene diisocyanate, cyclohexylene diisocyanate and isophorone diisocyanate; aromatic diisocyanates such as 2,4-tolylene diisocyanate, 4,4'-diphenylmethane diisocyanate, xylylene diisocyanate, and polymethylene polyphenyl isocyanate; isocyanate adducts such as a trimethylolpropane-tolylene diisocyanate trimer adduct (trade name: Coronate L, manufactured by Nippon Polyurethane Industry Co., Ltd), a trimethylolpropane-hexamethylene diisocyanate trimer adduct (trade name: Coronate HL, manufactured by Nippon Polyurethane Industry Co., Ltd) and an isocyanurate of hexamethylene diisocyanate (trade name: Coronate HX, manufactured by Nippon Polyurethane Industry Co., Ltd); polyether polyisocyanates and polyester polyisocyanates; adducts thereof with various polyols; and polyisocyanates polyfunctionalized with an isocyanurate bond, a biuret bond, an allophanate bond, or the like can be exemplified.

The isocyanate crosslinking agent may be used alone or in combination of two or more kinds. The total amount of the isocyanate crosslinking agent is preferably from 0.02 to 2 parts by weight, more preferably from 0.04 to 1.5 parts by weight, even more preferably from 0.05 to 1 part by weight, based on 100 parts by weight of the (meth)acrylic polymer. If it is less than 0.02 parts by weight, the cohesive strength can be insufficient in some cases. If it is more than 2 parts by weight, excessive crosslinking can be occurred to reduce the adhesion in some cases.

If necessary, the pressure-sensitive adhesive may conveniently contain various types of additives such as tackifiers, plasticizers, fillers such as glass fibers, glass beads, metal power, or any other inorganic powder, pigments, colorants, antioxidants, ultraviolet absorbers, and silane-coupling agents, without departing from the object of the present invention. The pressure-sensitive adhesive layer may also contain fine particles so as to have light diffusion properties.

In the pressure-sensitive adhesive optical film of the invention, the pressure-sensitive adhesive layer including the pressure-sensitive adhesive is formed on at least one side of the optical film.

As a method for forming the pressure-sensitive adhesive layer, for example, it can be formed by a method that includes applying the pressure-sensitive adhesive composition to a peeling-off treated separator or the like, removing polymerization solvents and the like by drying to form a pressure-sensitive adhesive layer and transferring the pressure-sensitive adhesive layer onto an optical film or by a method that includes applying the pressure-sensitive adhesive composition to an optical film and removing polymerization solvents and the like by drying to form a pressure-sensitive adhesive layer on the optical film. When the pressure-sensitive adhesive is applied, one or more optional solvents other than the polymerization solvent may be further added to the adhesive composition.

The surface of the optical film may be provided with an anchor layer or subjected to any adhesion-facilitating treatment such as corona treatment or plasma treatment, before the pressure-sensitive adhesive layer is formed. The surface of the pressure-sensitive adhesive layer may also be subjected to adhesion-facilitating treatment.

Various methods may be used to form the pressure-sensitive adhesive layer. Specific examples of such methods include roll coating, kiss roll coating, gravure coating, reverse coating, roll brush coating, spray coating, dip roll coating, bar coating, knife coating, air knife coating, curtain coating, lip coating, and extrusion coating with a die coater or the like.

The thickness of the pressure-sensitive adhesive layer is typically, but not limited to, from about 1 to 100 µm. In particular, the application to the thin-model pressure-sensitive adhesive layer is preferable, and the case that the thickness of the pressure-sensitive adhesive layer is from 1 to 15 µm is also preferable. The thickness of the pressure-sensitive adhesive layer may be reduced to 1 to 12 µm, further reduced to 1 to 10 µm, and still further reduced to 1 to 8 µm.

When the pressure-sensitive adhesive layer is exposed, the pressure-sensitive adhesive layer may be protected with a peeling-off treated sheet (a separator) until it is actually used.

Examples of the material for forming the separator include a plastic film such as a polyethylene, polypropylene, polyethylene terephthalate, or polyester film, a porous material such as paper, cloth or nonwoven fabric, and an appropriate thin material such as a net, a foamed sheet, a metal foil, and a laminate thereof. However, a plastic film is preferably used due to its good surface smoothness.

The plastic film may be any film capable of protecting the pressure-sensitive adhesive layer, and examples thereof include a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyurethane film, and an ethylene-vinyl acetate copolymer film.

The thickness of the separator is generally from 5 to 200 µm, preferably from about 5 to about 100 µm. If necessary, the separator may be treated with a release agent such as a silicone, fluoride, long-chain alkyl, or fatty acid amide release agent, or may be subjected to release and antifouling treatment with silica powder or to antistatic treatment of coating type, kneading and mixing type, vapor-deposition type, or the like. In particular, if the surface of the separator is appropriately subjected to release treatment such as silicone treatment, long-chain alkyl treatment, or fluorine treatment, the peeling properties from the pressure-sensitive adhesive layer can be further increased.

The peeling-off treated sheet used in the process of producing the pressure-sensitive adhesive optical film may be used as a separator for the pressure-sensitive adhesive optical film as it is, so that the process can be simplified.

The optical film may be any type of film that has been used to form image displays such as liquid crystal displays. For example, the optical film serves as a polarizing plate. A polarizing plate comprising a polarizer and a transparent protective film provided on one side or both sides of the polarizer is generally used.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type alignment films, such as dehydrated polyvinyl alcohol and dehydrochlorinated polyvinyl chloride, etc. may be mentioned. In these, a polyvinyl alcohol type film on which dichromatic materials such as iodine, is absorbed and aligned after stretched is suitably used. Although thickness of polarizer is not especially limited, the thickness of about 5 to 80 µm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

As a materials forming the transparent protective film prepared on one side or both sides of the above-mentioned polarizer, with outstanding transparency, mechanical strength, heat stability, moisture cover property, isotropy, etc. may be preferable. For example, polyester type polymers, such as polyethylene terephthalate and polyethylenenaphthalate; cellulose type polymers, such as diacetyl cellulose and triacetyl cellulose; acrylics type polymer, such as poly methyl-methacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; arylate type polymers; polyoxymethylene type polymers; epoxy type polymers; or blend polymers of the above-mentioned polymers may be mentioned. The transparent protective film can be formed as a cured layer made of heat curing type or ultraviolet ray curing type resins, such as acryl based, urethane based, acryl urethane based, epoxy based, and silicone based.

Moreover, as is described in JP-A 2001-343529 (WO 01/37007), polymer films, for example, resin compositions including (A) thermoplastic resins having substituted and/or non-substituted imido group is in side chain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used.

In general, a thickness of the protective film, which can be determined arbitrarily, is 1 to 500 µm, especially 5 to 200 µm in viewpoint of strength, work handling and thin layer.

The protective film is preferably as colorless as possible. Thus, a protective film is preferably used which has a film-thickness-direction retardation of −90 nm to +75 nm, wherein the retardation (Rth) is represented by the formula: $Rth=[(nx+ny)/(2-nz)]d$, wherein nx and ny are each a principal refractive index in the plane of the film, nz is a refractive index in the film-thickness direction, and d is the thickness of the film. If a protective film with such a thickness-direction retardation value (Rth) of −90 nm to +75 nm is used, coloring (optical coloring) of the polarizing plate can be almost avoided, which could otherwise be caused by any other protective film. The thickness-direction retardation (Rth) is more preferably from −80 nm to +60 nm, particularly preferably from −70 nm to +45 nm.

As the protective film, if polarization property and durability are taken into consideration, cellulose based polymer, such as triacetyl cellulose, is preferable, and especially triacetyl cellulose film is suitable. In addition, when the protective films are provided on both sides of the polarizer, the protective films comprising same polymer material may be used on both of a front side and a back side, and the protective films comprising different polymer materials etc. may be used.

The polarizer and the protective film are bonded with an aqueous adhesive. The aqueous adhesive includes isocyanate based adhesives, polyvinyl alcohol based adhesives, gelatin based adhesives, vinyl based latex based, aqueous polyester based adhesives, and the likes.

As the opposite side of the polarizing-adhering surface above-mentioned transparent protective film, a film with a hard coat layer and various processing aiming for antireflection, sticking prevention and diffusion or anti glare may be used.

A hard coat processing is applied for the purpose of protecting the surface of the polarization plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarization plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarization plate to disturb visual recognition of transmitting light through the polarization plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight parts to the transparent resin 100 weight parts that forms the fine concavo-convex structure on the surface, and preferably 5 to 25 weight parts. An anti glare layer may serve as a diffusion layer (viewing angle expanding function etc.) for diffusing transmitting light through the polarization plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective film.

Further an optical film of the present invention may be used as other optical layers, such as a reflective plate, a transflective plate, a retardation plate (a half wavelength plate and a quarter wavelength plate included), and a viewing angle compensation film, which may be used for formation of a liquid crystal display etc. These are used in practice as an optical film, or as one layer or two layers or more of optical layers laminated with polarizing plate.

Especially preferable polarizing plates are; a reflection type polarization plate or a transflective type polarization plate in which a reflective plate or a transflective reflective plate is further laminated onto a polarizing plate of the present invention; an elliptically polarizing plate or a circular polarizing plate in which a retardation plate is further laminated onto the polarizing plate; a wide viewing angle polarization plate in which a viewing angle compensation film is further laminated onto the polarizing plate; or a polarizing plate in which a brightness enhancement film is further laminated onto the polarizing plate.

A reflective layer is prepared on a polarization plate to give a reflection type polarization plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarization plate may be formed using suitable methods, such as a method in which a reflective layer of metal etc. is, if required, attached to one side of a polarization plate through a transparent protective layer etc.

As an example of a reflection type polarization plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarization plate, a reflection plate may also be used as a reflective sheet constituted by preparing a reflective layer on the suitable film for the transparent film. In addition, since a reflective layer is usually made of metal, it is desirable that the reflective side is covered with a protective film or a polarization plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarization plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarization plate. That is, the transflective type polarization plate is useful to obtain of a liquid crystal display of the type that saves energy of light sources, such as a back light, in a well-lighted atmosphere, and can be used with a built-in light source if needed in a comparatively dark atmosphere etc.

A description of the above-mentioned elliptically polarization plate or circularly polarization plate on which the retardation plate is laminated to the polarization plates will be made in the following paragraph. These polarization plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called λ/4 plate) is used. Usually, half-wavelength plate (also called λ/2 plate) is used, when changing the polarization direction of linearly polarized light.

Elliptically polarization plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarization plate in which three-dimensional refractive index is controlled may also preferably compensate (prevent) coloring produced when a screen of a liquid crystal display is viewed from an oblique direction. Circularly polarization plate is effectively used, for example, when adjusting a color tone of a picture of a reflection type liquid crystal display that provides a colored picture, and it also has function of antireflection.

As retardation plates, birefringence films obtained by uniaxial or biaxial stretching polymer materials, oriented films of liquid crystal polymers, and materials in which orientated layers of liquid crystal polymers are supported with films may be mentioned. Although a thickness of a retardation plate also is not especially limited, it is in general approximately from about 20 to 150 μm.

As polymer materials, for example, polyvinyl alcohols, polyvinyl butyrals, polymethyl vinyl ethers, poly hydroxyethyl acrylates, hydroxyethyl celluloses, hydroxypropyl celluloses, methyl celluloses, polycarbonates, polyarylates, polysulfones, polyethylene terephthalates, polyethylene naphthalates, polyethersulfones, polyphenylene sulfides, polyphenylene oxides, polyallyl sulfones, polyvinyl alcohols, polyamides, polyimides, polyolefins, polyvinyl chlorides, cellulose type polymers, or bipolymers, terpolymers, graft copolymers, blended materials of the above-mentioned polymers may be mentioned. These polymer raw materials make oriented materials (stretched film) using a stretching process and the like.

The oriented films of the liquid crystal polymer may be made of a liquid crystal material such as a liquid crystal polymer, a liquid crystal monomer or a mixture thereof.

The liquid crystal monomer may be a liquid crystal compound having various skeleton exhibiting nematic, cholesteric or smectic liquid crystal alignment and at least one unsaturated double bond moiety such as an acryloyl group, a methacryloyl group or a vinyl or one polymerizable functional group such as epoxy at its terminal. Among the liquid crystal monomers, nematic liquid crystal compounds having at least one unsaturated double bond moiety such as acryloyl or methacryloyl are preferably used. In order to improve durability, the liquid crystal monomer preferably has two or more photopolymerizable functional groups.

As liquid crystal polymers, for example, various kinds of polymers of principal chain type and side chain type in which conjugated linear atomic groups (mesogens) demonstrating liquid crystalline orientation are introduced into a principal chain and a side chain may be mentioned. As examples of principal chain type liquid crystal polymers, polymers having a structure where mesogen groups are combined by spacer parts demonstrating flexibility, for example, polyester based liquid crystal polymers of nematic orientation property, discotic polymers, cholesteric polymers, etc. may be mentioned. As examples of side chain type liquid crystal polymers, polymers having polysiloxanes, polyacrylates, polymethacrylates, or polymalonates as a principal chain structure, and polymers having mesogen parts comprising para-substituted ring compound units providing nematic orientation property as side chains via spacer parts comprising conjugated atomic groups may be mentioned.

The oriented films of the liquid crystal polymer, for example, is obtained by spreading a solution of a liquid crystal polymer on an orientation treated surface where rubbing treatment was performed to a surface of thin films, such as polyimide and polyvinyl alcohol, formed on a glass plate and or where silicon oxide was deposited by an oblique evaporation method, and then by heat-treating.

A retardation plate may be a retardation plate that has a proper retardation according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled.

The above-mentioned elliptically polarization plate and an above-mentioned reflected type elliptically polarization plate are laminated plate combining suitably a polarization plate or a reflection type polarization plate with a retardation plate. This type of elliptically polarization plate etc. may be manufactured by combining a polarization plate (reflected type) and a retardation plate, and by laminating them one by one separately in the manufacture process of a liquid crystal display. On the other hand, the polarization plate in which lamination was beforehand carried out and was obtained as an optical film, such as an elliptically polarization plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such viewing angle compensation retardation plate, in addition, a film having birefringence property that is processed by uniaxial stretching or orthogonal bidirectional stretching and a biaxially stretched film as inclined orientation film etc. may be used. As inclined orientation film, for example, a film obtained using a method in which a heat shrinking film is adhered to a polymer film, and then the combined film is heated and stretched or shrunk under a condition of being influenced by a shrinking force, or a film that is oriented in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarization plate with which a polarization plate and a brightness enhancement film are adhered together is usually used being prepared in a backside of a liquid crystal cell. A brightness enhancement film shows a characteristic that reflects linearly polarization light with a predetermined polarization axis, or circularly polarization light with a predetermined direction, and that transmits other light, when natural light by back lights of a liquid crystal display or by reflection from a back-side etc., comes in. The polarization plate, which is obtained by laminating a brightness enhancement film to a polarization plate, thus does not transmit light without the predetermined polarization state and reflects it, while obtaining transmitted light with the predetermined polarization state by accepting a light from light sources, such as a backlight. This polarization plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarization plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film; an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported; etc. may be mentioned.

Therefore, in the brightness enhancement film of a type that transmits a linearly polarized light having the above-mentioned predetermined polarization axis, by arranging the polarization axis of the transmitted light and entering the light into a polarization plate as it is, the absorption loss by the polarization plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarization plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarization plate may consist of multi-layered film of laminated layers of a polarization plate and two of more of optical layers as the above-mentioned separated type polarization plate. Therefore, a polarization plate may be a reflection type elliptically polarization plate or a semi-transmission type elliptically polarization plate, etc. in which the above-mentioned reflection type polarization plate or a transflective type polarization plate is combined with above described retardation plate respectively.

Although an optical film with the above described optical layer laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

In addition, ultraviolet absorbing property may be given to the above-mentioned each layer of the optical film, and the pressure-sensitive adhesive layer etc. of the pressure-sensitive adhesive optical film of the present invention, using a method of adding UV absorbents, such as salicylic acid ester type compounds, benzophenol type compounds, benzotriazol type compounds, cyano acrylate type compounds, and nickel complex salt type compounds.

The pressure-sensitive adhesive optical film of the present invention is preferably used to form various types of image displays such as liquid crystal displays. Liquid crystal displays may be formed according to conventional techniques. Specifically, liquid crystal displays are generally formed by appropriately assembling a liquid crystal cell and the pressure-sensitive adhesive optical film and optionally other components such as a lighting system and incorporating a driving circuit according to any conventional technique, except that the optical film of the present invention is used. Any type of liquid crystal cell may also be used such as a TN type, an STN type and a n type.

Suitable liquid crystal displays, such as liquid crystal display with which the above pressure-sensitive adhesive optical film has been located at one side or both sides of the liquid crystal cell, and with which a backlight or a reflective plate is used for a lighting system may be manufactured. In this case, the optical film may be installed in one side or both sides of the liquid crystal cell. When installing the optical films in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

EXAMPLES

The invention is more specifically described with respect to the Examples herein below, however the invention is not limited to the Examples. In each example, both of "parts" and "%" are on the basis of weight.

The evaluation items in the examples and the like were measured as described below.

<Measurement of Weight Average Molecular Weight>

The weight average molecular weight of the resulting (meth)acrylic polymer was measured by gel permeation chromatography (GPC):
analyzer: HLC-8120GPC manufactured by Tosoh Corporation
data processor: GPC-8020 manufactured by Tosoh Corporation;
column: G7000HXL-H+GMHXL+GMHXL manufactured by Tosoh Corporation
column size: each 7.8 mmφ×30 cm (90 cm in total)
flow rate: 0.8 ml/minute
injected sample concentration: about 0.1% by weight
injection volume: 100 μl
column temperature: 40° C.
eluent: tetrahydrofuran
detector: differential refractometer (RI).

The molecular weight was calculated by polystyrene conversion. The weight fraction (% by area) of polymers with molecular weights of 100,000 or less was calculated from the result of the GPC measurement with the data processor. In this process, monomer components were not included.

Production Example 1

Production of (Meth)Acrylic Polymer

To a four-neck flask equipped with a stirring blade, a thermometer, a nitrogen gas introducing tube, and a condenser were added 91 parts of butyl acrylate, 6 parts of N-acryloylmorpholine, 2.7 parts of acrylic acid, 0.3 parts of 2-hydroxybutyl acrylate, 0.1 parts of 2,2'-azobisisobutyronitrile as a polymerization initiator, and 200 parts of ethyl acetate. Nitrogen gas was introduced to replace the air, while the mixture was gently stirred, and then a polymerization reaction was performed for 8 hours, while the temperature of the liquid in the flask was kept at about 55° C., to prepare a solution of an acrylic polymer. The acrylic polymer had a weight average molecular weight of 2,200,000.

Production Examples 2 to 36

Acrylic polymer solutions were prepared using the process of Production Example 1, except that at least one of the type and amount of the monomer components and the amount of the polymerization initiator was changed as shown in Table 1. The weight average molecular weight of the acrylic polymer obtained in each Example is shown in Table 1.

Example 1

Production of Pressure-Sensitive Adhesive Layer-Carrying Polarizing Plate

Based on 100 parts of the solids in the acrylic polymer solution obtained in Production Example 1, 0.2 parts of a polyisocyanate crosslinking agent including a trimethylolpropane-tolylene diisocyanate adduct as a crosslinking agent (Coronate L, manufactured by Nippon Polyurethane Industry Co., Ltd.) was added to the acrylic polymer solution to prepare an acrylic pressure-sensitive adhesive solution.

The acrylic pressure-sensitive adhesive solution was then applied to one side of a silicone-treated polyethylene terephthalate (PET) film (38 μm in thickness, manufactured by Mitsubishi Polyester Film Corp.) and dried at 150° C. for 3 minutes to form a pressure-sensitive adhesive layer having a thickness of 5 μm after the drying. The pressure-sensitive adhesive layer was transferred to a polarizing plate (SEG5224DU, manufactured by Nitto Denko Corporation) to prepare a pressure-sensitive adhesive layer-carrying polarizing plate ($A_1$).

Examples 2 to 16 and Comparative Examples 1 to 25

Pressure-sensitive adhesive layer-carrying polarizing plates ($A_1$) were prepared using the process of Example 1, except that the types of the acrylic polymer solution for the preparation of the acrylic pressure-sensitive adhesive solution, the amount of the crosslinking agent, and the thickness of the pressure-sensitive adhesive layer after the drying were changed as shown in Table 2.

Example 17

A pressure-sensitive adhesive layer-carrying retardation plate ($A_3$) was prepared using the process of Example 1, except that a retardation plate (Arton (product name), a norbornene resin film, manufactured by JSR Corporation) was used in place of the polarizing plate. The retardation plate side of the resulting pressure-sensitive adhesive layer-carrying retardation plate ($A_3$) was adhered to the pressure-sensitive adhesive layer-carrying polarizing plate ($A_1$) obtained in Example 1 to prepare a pressure-sensitive adhesive layer-carrying laminated optical film having the structure of polarizing plate/pressure-sensitive adhesive layer/retardation plate/pressure-sensitive adhesive layer.

Comparative Example 26

A pressure-sensitive adhesive layer-carrying retardation plate ($A_3$) was prepared using the process of Example 1, except that the type of the acrylic polymer solution for the preparation of the acrylic pressure-sensitive adhesive solution and the amount of the crosslinking agent were changed as shown in Table 2 and that a retardation plate (Arton (product name), a norbornene resin film, manufactured by JSR Corporation) was used in place of the polarizing plate. The retardation plate side of the resulting pressure-sensitive adhesive layer-carrying retardation plate (A$_3$) was adhered to the pressure-sensitive adhesive layer-carrying polarizing plate (A$_1$) obtained in Example 1 to prepare a pressure-sensitive adhesive layer-carrying laminated optical film having the structure of polarizing plate/pressure-sensitive adhesive layer/retardation plate/pressure-sensitive adhesive layer.

The pressure-sensitive adhesive layer-carrying polarizing plate (A$_1$) or the pressure-sensitive adhesive layer-carrying laminated optical film obtained in each of Examples 1 to 17 and Comparative Examples 1 to 26 was evaluated as described below. The results of the evaluation are shown in Table 2.

<Evaluation of Durability>
(Preparation of Samples)

To a four-neck flask equipped with a stirring blade, a thermometer, a nitrogen gas introducing tube, and a condenser were added 100 parts of butyl acrylate, 5 parts of acrylic acid, 0.1 parts of 2-hydroxybutyl acrylate, 0.1 parts of 2,2'-azobisisobutyronitrile as a polymerization initiator, and 200 parts of ethyl acetate. Nitrogen gas was introduced to replace the air, while the mixture was gently stirred, and then a polymerization reaction was performed for 8 hours, while the temperature of the liquid in the flask was kept at about 55° C., to prepare a solution of an acrylic polymer. The acrylic polymer had a weight average molecular weight of 1,920,000. Based on 100 parts of the solids in the resulting acrylic polymer solution, 0.6 part of a polyisocyanate crosslinking agent including a trimethylolpropane-tolylene diisocyanate adduct as a crosslinking agent (Coronate L, manufactured by Nippon Polyurethane Industry Co., Ltd.) was added to the acrylic polymer solution to prepare an acrylic pressure-sensitive adhesive solution. It was named acrylic pressure-sensitive adhesive solution A.

The acrylic pressure-sensitive adhesive solution was then applied to one side of a silicone-treated polyethylene terephthalate (PET) film (38 μm in thickness, manufactured by Mitsubishi Polyester Film Corp.) and dried at 130° C. for 3 minutes to form a pressure-sensitive adhesive layer, which had a thickness of 25 μm after the drying. The pressure-sensitive adhesive layer was transferred to a retardation plate (Arton (product name), a norbornene resin film, manufactured by JSR Corporation) to prepare a pressure-sensitive adhesive layer-carrying retardation plate (A$_2$).

The pressure-sensitive adhesive layer-carrying polarizing plate (A$_1$) or the pressure-sensitive adhesive layer-carrying laminated optical film obtained in each of the Examples and the Comparative Examples was adhered to the retardation plate side of the pressure-sensitive adhesive layer-carrying retardation plate (A$_2$) to form a sample. The sample using the pressure-sensitive adhesive layer-carrying polarizing plate (A$_1$) was named sample 1, which corresponded to the structure shown in FIG. 2. The sample using the pressure-sensitive adhesive layer-carrying laminated optical film was named sample 2, which corresponded to the structure shown in FIG. 3.

(Heat Resistance Test)

The samples 1 and 2 were each cut into 5 inch size pieces. Each sample piece was adhered to a 0.5 mm non-alkali glass plate (1737, manufactured by Corning Incorporated) and then autoclaved at 50° C. and 0.5 Mpa for 15 minutes. The sample piece was then stored in the atmosphere at 90° C. for 500 hours and cooled to room temperature (about 25° C.).

(Humidity Resistance Test)

The samples 1 and 2 were each cut into 5 inch size pieces. Each sample piece was adhered to a 0.5 mm non-alkali glass plate (1737, manufactured by Corning Incorporated) and then autoclaved at 50° C. and 0.5 Mpa for 15 minutes. The sample piece was then stored in the atmosphere at 60° C. and 95% RH for 500 hours and cooled to room temperature (about 25° C.).

Evaluation was visually performed based on the criteria below in each of the heat resistance test and the humidity resistance test.

◯: Neither peeling-off, separation nor foaming was observed
x: Peeling-off, separation or foaming was observed <Measurement of Adhesive Strength>

The pressure-sensitive adhesive layer-carrying polarizing plate (A$_1$) or the pressure-sensitive adhesive layer-carrying laminated optical film obtained in each of the Examples and the Comparative Examples was adhered to a retardation plate (Arton (product name), a norbornene resin film, manufactured by JSR Corporation). The laminate was cut into a 25 mm×150 mm piece, which was subjected to adhesive strength measurement at a peel angle of 90° and a peel rate of 300 mm/minute with a tensile tester.

<Adhering Properties>

In the evaluation of durability, the state of the laminate of the pressure-sensitive adhesive layer-carrying retardation plate (A$_2$) and the pressure-sensitive adhesive layer-carrying polarizing plate (A$_1$) or the pressure-sensitive adhesive layer-carrying laminated optical film was visually evaluated based on the criteria below.

◯: The lamination was well performed without incorporation of air bubbles and the like
x: Incorporation of air bubbles and the like made it difficult to perform the lamination

TABLE 1

| | Alkyl (Meth)acrylate | | | Heterocyclic Ring-Containing Monomer | | Non-Heterocyclic Amino Group-Containing Monomer and the like | | AA | HBA | Amount of Polymerization Initiator | Weight Average Molecular Weight |
|---|---|---|---|---|---|---|---|---|---|---|---|
| | BA (parts) | 2EHA (parts) | CHA (parts) | Type | Parts | Type | Parts | (parts) | (parts) | (parts) | (×10$^4$) |
| Production Example 1 | 91 | — | — | ACMO | 6 | — | — | 2.7 | 0.3 | 0.1 | 220 |
| Production Example 2 | 90 | — | — | ACMO | 7 | — | — | 2.7 | 0.3 | 0.1 | 165 |
| Production Example 3 | 87.5 | — | — | ACMO | 9.5 | — | — | 2.7 | 0.3 | 0.1 | 185 |
| Production Example 4 | 92.5 | — | — | ACMO | 3.5 | — | — | 2.7 | 0.3 | 0.1 | 240 |
| Production Example 5 | 92 | — | — | ACMO | 6 | — | — | 1.7 | 0.3 | 0.1 | 210 |

TABLE 1-continued

| | Monomer Components | | | | | | | | | | |
|---|---|---|---|---|---|---|---|---|---|---|---|
| | Alkyl (Meth)acrylate | | | Heterocyclic Ring-Containing Monomer | | Non-Heterocyclic Amino Group-Containing Monomer and the like | | AA | HBA | Amount of Polymerization Initiator | Weight Average Molecular Weight |
| | BA (parts) | 2EHA (parts) | CHA (parts) | Type | Parts | Type | Parts | (parts) | (parts) | (parts) | ($\times 10^4$) |
| Production Example 6 | 89 | — | — | ACMO | 6 | — | — | 4.7 | 0.3 | 0.1 | 230 |
| Production Example 7 | 93 | — | — | ACMO | 6 | — | — | 0.7 | 0.3 | 0.1 | 230 |
| Production Example 8 | 91.22 | — | — | ACMO | 6 | — | — | 2.7 | 0.08 | 0.1 | 160 |
| Production Example 9 | 90.3 | — | — | ACMO | 6 | — | — | 2.7 | 1 | 0.1 | 240 |
| Production Example 10 | 89.5 | — | — | ACMO | 6 | — | — | 2.7 | 1.8 | 0.1 | 250 |
| Production Example 11 | 91 | — | — | ACPI | 6 | — | — | 2.7 | 0.3 | 0.1 | 230 |
| Production Example 12 | 91 | — | — | MACPI | 6 | — | — | 2.7 | 0.3 | 0.1 | 230 |
| Production Example 13 | 91 | — | — | ACPY | 6 | — | — | 2.7 | 0.3 | 0.1 | 200 |
| Production Example 14 | 50 | 41 | — | ACMO | 6 | — | — | 2.7 | 0.3 | 0.1 | 190 |
| Production Example 15 | 96.7 | — | — | — | 0 | — | — | 3 | 0.3 | 0.1 | 240 |
| Production Example 16 | 84 | — | — | ACMO | 13 | — | — | 2.7 | 0.3 | 0.1 | 220 |
| Production Example 17 | 95.5 | — | — | ACMO | 1.5 | — | — | 2.7 | 0.3 | 0.1 | 210 |
| Production Example 18 | 93.7 | — | — | ACMO | 6 | — | — | 0 | 0.3 | 0.1 | 205 |
| Production Example 19 | 93.5 | — | — | ACMO | 6 | — | — | 0.2 | 0.3 | 0.1 | 195 |
| Production Example 20 | 87.7 | — | — | ACMO | 6 | — | — | 6 | 0.3 | 0.1 | 220 |
| Production Example 21 | 91.3 | — | — | ACMO | 6 | — | — | 2.7 | 0 | 0.1 | 230 |
| Production Example 22 | 86.3 | — | — | ACMO | 6 | — | — | 2.7 | 5 | 0.1 | 235 |
| Production Example 23 | 91 | — | — | ACMO | 6 | — | — | 2.7 | 0.3 | 0.05 | 320 |
| Production Example 24 | 91 | — | — | ACMO | 6 | — | — | 2.7 | 0.3 | 0.3 | 130 |
| Production Example 25 | 91 | — | — | ACMO | 6 | — | — | 2.7 | 0.3 | 0.8 | 75 |
| Production Example 26 | 83 | — | — | — | — | DMAA | 13 | 3 | 1 | 0.3 | 120 |
| Production Example 27 | 83 | — | — | — | — | DMAA | 13 | 3 | 1 | 0.1 | 230 |
| Production Example 28 | 90 | — | — | — | — | DMAA | 7 | 2.7 | 0.3 | 0.1 | 220 |
| Production Example 29 | 80 | — | — | — | — | DMAA | 3 | 15 | 2 | 0.83 | 85 |
| Production Example 30 | 91 | — | — | — | — | DMAPAA | 6 | 2.7 | 0.3 | 0.1 | 210 |
| Production Example 31 | 91 | — | — | — | — | DMAEA | 6 | 2.7 | 0.3 | 0.1 | 200 |
| Production Example 32 | 91 | — | — | — | — | IPAA | 6 | 2.7 | 0.3 | 0.1 | 220 |
| Production Example 33 | 91 | — | — | — | — | VP | 6 | 2.7 | 0.3 | 0.1 | 200 |
| Production Example 34 | 83 | — | 15 | — | — | — | 0 | 0 | 2 | 0.1 | 150 |
| Production Example 35 | 80 | — | 17 | — | — | — | 0 | 2.7 | 0.3 | 0.1 | 180 |
| Production Example 36 | 91 | — | — | — | — | CHMI | 6 | 2.7 | 0.3 | 0.1 | 185 |

In Table 1, BA represents butyl acrylate, 2EHA 2-ethylhexyl acrylate, CHA cyclohexyl acrylate, ACMO N-acryloylmorpholine, ACPI N-acryloylpiperidine, MACPI N-methacryloylpiperidine, ACPY N-acryloylpyrrolidine, AA acrylic acid, HBA 2-hydroxybutyl acrylate, DMAA dimethylacrylamide, DMAPAA dimethylaminopropylacrylamide, DMAEA dimethylaminoacrylate, IPAA isopropylacrylamide, VP N-vinylpyrrolidone, and CHMI N-cyclohexylmaleimide.

TABLE 2

| | Acrylic polymer Type | Amount of Isocyanate crosslinking agent (parts) | Sample Structure | Thickness of Pressure-Sensitive Adhesive Layer (µm) | Evaluation | | | |
|---|---|---|---|---|---|---|---|---|
| | | | | | Durability | | Adhesive Strength (N/25 mm) | Adhering properties |
| | | | | | Heat Resistance | Humidity Resistance | | |
| Example 1 | Production Example 1 | 0.2 | 1 | 5 | ○ | ○ | 6 | ○ |
| Example 2 | Production Example 1 | 0.5 | 1 | 5 | ○ | ○ | 5.5 | ○ |
| Example 3 | Production Example 1 | 0.7 | 1 | 5 | ○ | ○ | 5.2 | ○ |
| Example 4 | Production Example 2 | 0.5 | 1 | 5 | ○ | ○ | 5.6 | ○ |
| Example 5 | Production Example 3 | 0.5 | 1 | 5 | ○ | ○ | 5.6 | ○ |
| Example 6 | Production Example 4 | 0.5 | 1 | 5 | ○ | ○ | 6.1 | ○ |
| Example 7 | Production Example 5 | 0.5 | 1 | 5 | ○ | ○ | 5.2 | ○ |
| Example 8 | Production Example 6 | 0.5 | 1 | 5 | ○ | ○ | 6.4 | ○ |
| Example 9 | Production Example 7 | 0.5 | 1 | 5 | ○ | ○ | 4.7 | ○ |
| Example 10 | Production Example 8 | 0.5 | 1 | 5 | ○ | ○ | 5.4 | ○ |
| Example 11 | Production Example 9 | 0.5 | 1 | 5 | ○ | ○ | 5.3 | ○ |
| Example 12 | Production Example 10 | 0.5 | 1 | 5 | ○ | ○ | 5.5 | ○ |
| Example 13 | Production Example 11 | 0.5 | 1 | 5 | ○ | ○ | 5.5 | ○ |
| Example 14 | Production Example 12 | 0.5 | 1 | 5 | ○ | ○ | 5.3 | ○ |
| Example 15 | Production Example 13 | 0.5 | 1 | 5 | ○ | ○ | 5.2 | ○ |
| Example 16 | Production Example 14 | 0.5 | 1 | 5 | ○ | ○ | 5.2 | ○ |
| Example 17 | Production Example 1 | 0.5 | 2 | 5 | ○ | ○ | 5.5 | ○ |
| Comparative Example 1 | Production Example 15 | 0.5 | 1 | 5 | x | x | 4.1 | ○ |
| Comparative Example 2 | Production Example 16 | 0.5 | 1 | 5 | ○ | x | 3.2 | x |

TABLE 2-continued

|  | Acrylic polymer Type | Amount of Isocyanate crosslinking agent (parts) | Sample Structure | Thickness of Pressure-Sensitive Adhesive Layer (μm) | Evaluation | | Adhesive Strength (N/25 mm) | Adhering properties |
|---|---|---|---|---|---|---|---|---|
|  |  |  |  |  | Durability | | | |
|  |  |  |  |  | Heat Resistance | Humidity Resistance | | |
| Comparative Example 3 | Production Example 17 | 0.2 | 1 | 5 | x | x | 6.1 | ○ |
| Comparative Example 4 | Production Example 17 | 0.5 | 1 | 5 | x | x | 5.5 | ○ |
| Comparative Example 5 | Production Example 17 | 0.7 | 1 | 5 | x | x | 4.3 | ○ |
| Comparative Example 6 | Production Example 18 | 0.5 | 1 | 5 | x | x | 4.5 | ○ |
| Comparative Example 7 | Production Example 19 | 0.5 | 1 | 5 | x | ○ | 5.1 | ○ |
| Comparative Example 8 | Production Example 20 | 0.5 | 1 | 5 | x | x | 3.5 | ○ |
| Comparative Example 9 | Production Example 21 | 0.5 | 1 | 5 | x | ○ | 5.5 | ○ |
| Comparative Example 10 | Production Example 22 | 0.5 | 1 | 5 | x | x | 3.2 | x |
| Comparative Example 11 | Production Example 23 | 0.5 | 1 | 5 | x | x | 2.7 | x |
| Comparative Example 12 | Production Example 24 | 0.5 | 1 | 5 | x | x | 5.4 | ○ |
| Comparative Example 13 | Production Example 25 | 0.5 | 1 | 5 | x | x | 6.1 | ○ |
| Comparative Example 14 | Production Example 26 | 0.5 | 1 | 5 | x | x | 4.2 | ○ |
| Comparative Example 15 | Production Example 27 | 0.5 | 1 | 5 | ○ | x | 5.5 | ○ |
| Comparative Example 16 | Production Example 28 | 0.5 | 1 | 5 | x | x | 6.7 | ○ |
| Comparative Example 17 | Production Example 29 | 0.5 | 1 | 5 | x | x | 3.8 | ○ |
| Comparative Example 18 | Production Example 30 | 0.5 | 1 | 5 | x | x | 5.3 | ○ |
| Comparative Example 19 | Production Example 31 | 0.5 | 1 | 5 | x | x | 5.5 | ○ |
| Comparative Example 20 | Production Example 32 | 0.5 | 1 | 5 | x | x | 5.4 | ○ |
| Comparative Example 21 | Production Example 33 | 0.5 | 1 | 5 | x | x | 5.6 | ○ |
| Comparative Example 22 | Production Example 34 | 0.5 | 1 | 5 | x | x | 3.8 | ○ |
| Comparative Example 23 | Production Example 35 | 0.5 | 1 | 5 | x | x | 4.1 | ○ |
| Comparative Example 24 | Production Example 36 | 0.5 | 1 | 5 | x | x | 3.5 | x |
| Comparative Example 25 | Production Example 15 | 0.5 | 1 | 10 | x | x | 6.2 | ○ |
| Comparative Example 26 | Production Example 15 | 0.5 | 2 | 5 | x | x | 4.1 | ○ |

<Retardation Plate 1>

A 48 μm-thick norbornene resin film (Arton (product name), manufactured by JSR Corporation) was transversely stretched to 1.71 times at 150° C. The resulting retardation plate (named retardation plate 1) had a thickness of 28 μm, an in-plane retardation of 140 nm and an Nz coefficient of 1.55.

<Retardation Plate 2>

A 60 μm-thick norbornene resin film (Zeonor (product name), manufactured by Zeon Corporation) was uniaxially stretched to 1.28 times at 140° C. The resulting retardation plate (named retardation plate 2) had a thickness of 35 μm, an in-plane retardation of 130 nm and an Nz coefficient of 1.0.

<Retardation Plate 3>

90 parts of the nematic liquid crystal compound represented by the following formula 1:

[Chemical Formula 1]

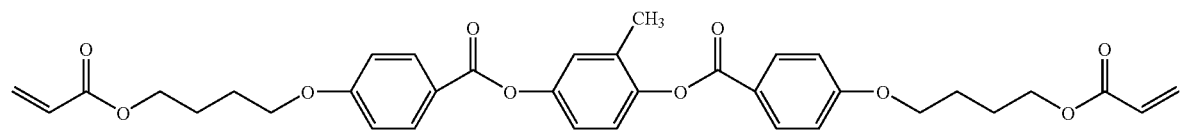

10 parts of the chiral agent represented by the following formula 2:

[Chemical Formula 2]

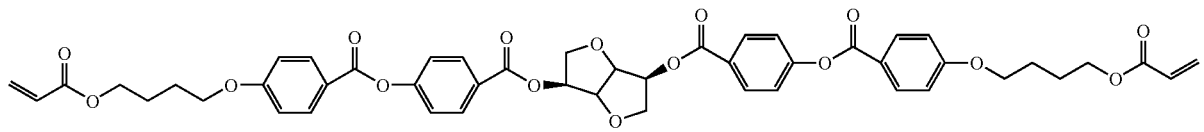

5 parts of a photopolymerization initiator (Irgacure 907, manufactured by Ciba Specialty Chemicals Inc.), and 300 parts of methyl ethyl ketone were mixed uniformly to give a liquid crystal coating liquid. The liquid crystal coating liquid was applied to a substrate (a biaxially stretched polyethylene terephthalate film) and heated at 80° C. for 3 minutes. The coating was then polymerized by exposure to ultraviolet light to form an aligned cholesteric solid layer (2 μm in thickness). The aligned cholesteric solid layer had a retardation of 120 nm in the thickness direction. A curable isocyanate-based adhesive (5 μm in thickness) was applied to the aligned cholesteric solid layer. The retardation plate 2 was adhered to the aligned cholesteric solid layer with the adhesive interposed therebetween to form a laminate (named retardation plate 3).

Example 18

Preparation of Pressure-Sensitive Adhesive Layer-Carrying Polarizing Plate

Based on 100 parts of the solids in the acrylic polymer solution obtained in Production Example 1, 0.5 parts of a polyisocyanate crosslinking agent including a trimethylolpropane-tolylene diisocyanate adduct as a crosslinking agent (Coronate L manufactured by Nippon Polyurethane Industry Co., Ltd.) was added to the acrylic polymer solution to prepare an acrylic pressure-sensitive adhesive solution.

The acrylic pressure-sensitive adhesive solution was then applied to one side of a silicone-treated polyethylene terephthalate (PET) film (38 μm in thickness, manufactured by Mitsubishi Polyester Film Corp.) and dried at 150° C. for 3 minutes to form a pressure-sensitive adhesive layer having a thickness of 5 μm after the drying. The pressure-sensitive adhesive layer was transferred to a polarizing plate (SEG5224DU, manufactured by Nitto Denko Corporation) to prepare a pressure-sensitive adhesive layer-carrying polarizing plate ($A_{1-1}$).

(Preparation of Pressure-Sensitive Adhesive Layer-Carrying Laminated Optical Film)

The acrylic pressure-sensitive adhesive solution A prepared for the evaluation of the durability was applied to one side of a silicone-treated polyethylene terephthalate (PET) film (38 μm in thickness, manufactured by Mitsubishi Polyester Film Corp.) and dried at 130° C. for 3 minutes to form a pressure-sensitive adhesive layer having a thickness of 25 μm after the drying. The pressure-sensitive adhesive layer was transferred to the retardation plate 1 to form a pressure-sensitive adhesive layer-carrying retardation plate ($A_{3-1}$). The pressure-sensitive adhesive layer-carrying polarizing plate ($A_{1-1}$) was adhered to the retardation plate 1 side of the pressure-sensitive adhesive layer-carrying retardation plate ($A_{3-1}$) to form a pressure-sensitive adhesive layer-carrying laminated optical film having the structure of polarizing plate/pressure-sensitive adhesive layer/retardation plate 1/pressure-sensitive adhesive layer (structure 2-1).

Example 19

A pressure-sensitive adhesive layer-carrying laminated optical film having the structure of polarizing plate/pressure-sensitive adhesive layer/retardation plate 3/pressure-sensitive adhesive layer (structure 2-2) was prepared using the process of Example 18, except that the retardation plate 3 was used in place of the retardation plate 1. The 25 μm-thick pressure-sensitive adhesive layer was formed on the liquid crystal layer side of the retardation plate 3 with the acrylic pressure-sensitive adhesive solution A.

Examples 20 to 24 and Comparative Examples 27 to 34

Pressure-sensitive adhesive layer-carrying laminated optical films were prepared using the process of Example 18, except that the type of the acrylic polymer solution for the preparation of the acrylic pressure-sensitive adhesive solution, the post-drying thickness of the pressure-sensitive adhesive layer laminated on the polarizing plate, and the structure of the laminated optical film were changed as shown in Table 3.

The pressure-sensitive adhesive layer-carrying laminated optical film obtained in each of Examples 18 to 24 and Comparative Examples 27 to 34 was evaluated for durability as described above and for change in retardation as described below. The results of the evaluation are shown in Table 3.

<Change in Retardation>

The pressure-sensitive adhesive layer-carrying laminated optical film was cut into a 40 mm×30 mm piece, which was adhered to a 0.5 mm non-alkali glass plate (1737, manufactured by Corning Incorporated). Thereafter, the retardation of the central portion of the resulting sample was measured (at a measurement wavelength of 550 nm). The retardation was measured with RETS-1200VA manufactured by Otsuka Electronics Co., Ltd. The sample adhered to the glass plate was stored at 90° C. for 500 hours and then cooled to room temperature (about 25° C.) and measured for retardation again. When the change in retardation from the initial value was 2 nm or less, it was expressed as "◯." When the change in retardation from the initial value was more than 2 nm, it was expressed as "x."

TABLE 3

| | Acrylic polymer Type | Laminated Structure | Thickness of Pressure-Sensitive Adhesive Layer Laminated on Polarizing Plate (μm) | Evaluation Durability | | |
|---|---|---|---|---|---|---|
| | | | | Heat Resistance | Humidity Resistance | Change in Retardation |
| Example 18 | Production Example 1 | 2-1 | 5 | ○ | ○ | ○ |
| Example 19 | Production Example 1 | 2-2 | 5 | ○ | ○ | ○ |
| Example 20 | Production Example 3 | 2-1 | 5 | ○ | ○ | ○ |
| Example 21 | Production Example 3 | 2-2 | 5 | ○ | ○ | ○ |
| Example 22 | Production Example 5 | 2-1 | 5 | ○ | ○ | ○ |
| Example 23 | Production Example 11 | 2-1 | 5 | ○ | ○ | ○ |
| Example 24 | Production Example 1 | 2-1 | 30 | ○ | ○ | x |
| Comparative Example 27 | Production Example 15 | 2-1 | 5 | x | x | x |
| Comparative Example 28 | Production Example 16 | 2-1 | 5 | ○ | x | ○ |
| Comparative Example 29 | Production Example 17 | 2-1 | 5 | x | x | x |
| Comparative Example 30 | Production Example 18 | 2-1 | 5 | x | x | x |
| Comparative Example 31 | Production Example 27 | 2-1 | 5 | ○ | x | ○ |
| Comparative Example 32 | Production Example 24 | 2-1 | 5 | x | x | x |
| Comparative Example 33 | Production Example 23 | 2-1 | 5 | x | x | ○ |
| Comparative Example 34 | Production Example 15 | 2-1 | 10 | x | x | x |

In Examples 18 to 24, as the pressure-sensitive adhesive layer, the (meth)acrylic polymer of the specific composition according to the invention is used as a base polymer solution in which the durability is good. It can be understood that the pressure-sensitive adhesive layer according to the invention is sufficiently durable, even when it is made thin, and that in Examples 18 to 23, the change in retardation can be controlled to be small when the pressure-sensitive adhesive layer is made thin.

The invention claimed is:

1. A pressure-sensitive adhesive optical film comprising an optical film and a pressure-sensitive adhesive layer on at least one side of the optical film, wherein the pressure-sensitive adhesive layer is formed by a pressure-sensitive adhesive, comprising:
  a (meth)acrylic polymer having a weight average molecular weight of 1,600,000 to 2,800,000; containing, as a monomer component,
  3.5 to 9.5% by weight of N-acryloylmorpholine;
  0.7 to 4.7% by weight of acrylic acid;
  0.08 to 1.8% by weight of hydroxybutyl acrylate; and
  87.5 to 93% by weight of an alkyl (meth)acrylate monomer, wherein the alkyl (meth)acrylate monomer contains butyl acrylate,
  and a crosslinking agent.

2. The pressure-sensitive adhesive optical film according to claim 1, wherein the crosslinking agent is an isocyanate crosslinking agent.

3. The pressure-sensitive adhesive optical film according to claim 1, wherein an amount of the crosslinking agent is from 0.02 to 2 parts by weight, based on 100 parts by weight of the (meth)acrylic polymer.

4. The pressure-sensitive adhesive optical film according to claim 1, wherein the pressure-sensitive adhesive layer has a thickness of 1 to 15 μm.

5. The pressure-sensitive adhesive optical film according to claim 1, wherein the optical film is a polarizing plate or a retardation plate.

6. The pressure-sensitive adhesive optical film according to claim 1, wherein the weight average molecular weight is 1,700,000 to 2,700,000.

7. The pressure-sensitive adhesive optical film according to claim 1, wherein the weight average molecular weight is 2,000,000 to 2,500,000.

8. The pressure-sensitive adhesive optical film according to claim 1, wherein the weight average molecular weight is 1,600,000 to 2,500,000.

9. A laminated optical film, wherein the pressure-sensitive adhesive optical film according to claim 1 is laminated on another optical film with the pressure-sensitive adhesive layer of the pressure-sensitive adhesive optical film interposed therebetween.

10. An image display, comprising at least one sheet of the pressure-sensitive adhesive optical film according to the laminated optical film according to claim 9.

11. The laminated optical film according to claim 9, wherein the pressure-sensitive adhesive optical film according to claim 1 is a pressure-sensitive adhesive polarizing plate, and the another optical film is a retardation plate.

12. An image display, comprising at least one sheet of the pressure-sensitive adhesive optical film according to claim 1.

* * * * *